(No Model.) 4 Sheets—Sheet 1.
F. W. G. BOETTCHER.
DISPLAY APPARATUS.

No. 546,912. Patented Sept. 24, 1895.

Witnesses
Severance
W. Harry Muzzy

Inventor
Friedrich W. G. Boettcher
by
Mason Fenwick Lawrence
his Attorneys (No Model.) 4 Sheets—Sheet 2.

F. W. G. BOETTCHER.
DISPLAY APPARATUS.

No. 546,912. Patented Sept. 24, 1895.

Witnesses
Severance
W. Harvey Muzzy

Inventor
Friedrich W. G. Boettcher
by
Mason Fenwick & Lawrence
his Attorneys

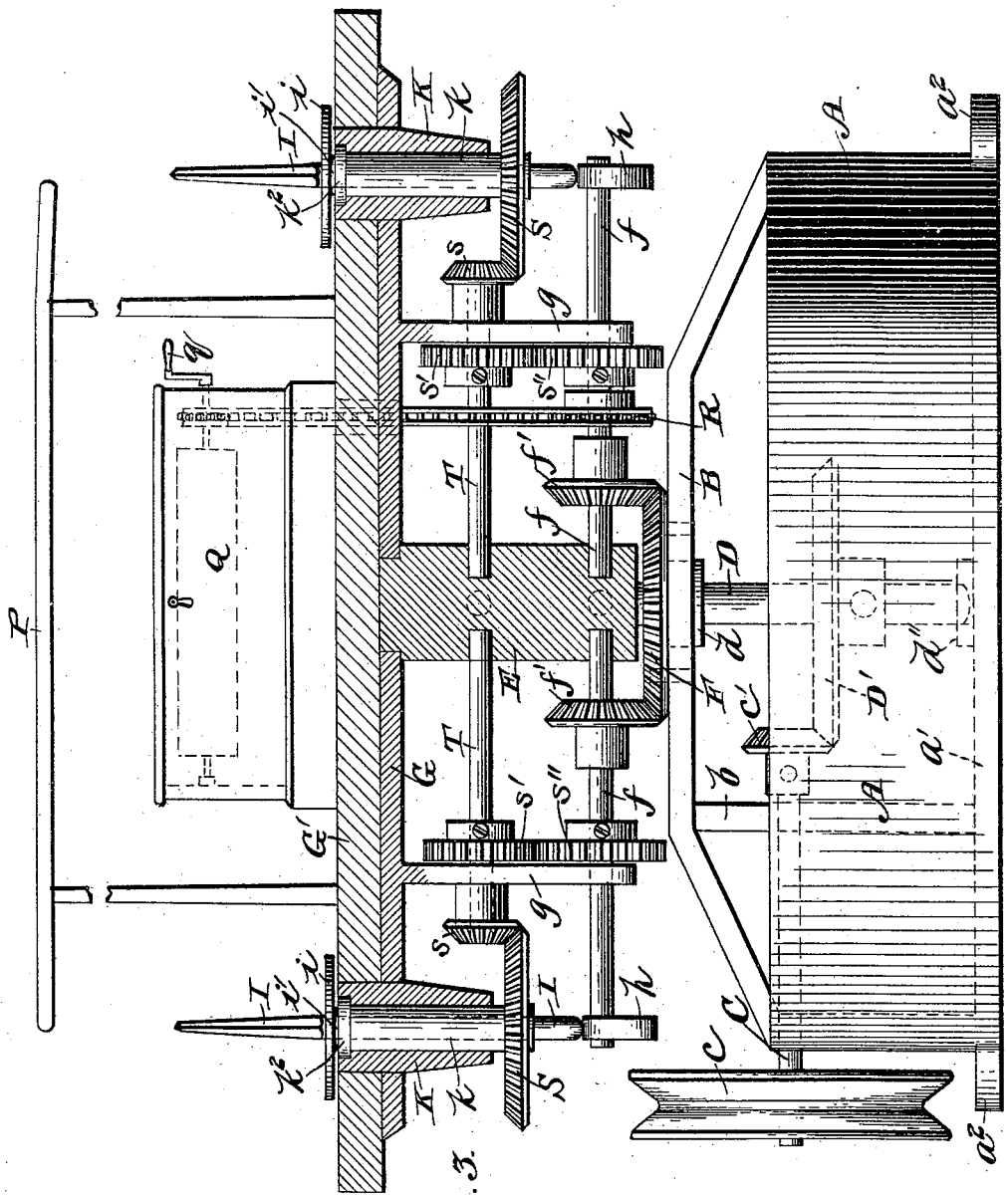

(No Model.)  4 Sheets—Sheet 4.
F. W. G. BOETTCHER.
DISPLAY APPARATUS.
No. 546,912.  Patented Sept. 24, 1895.
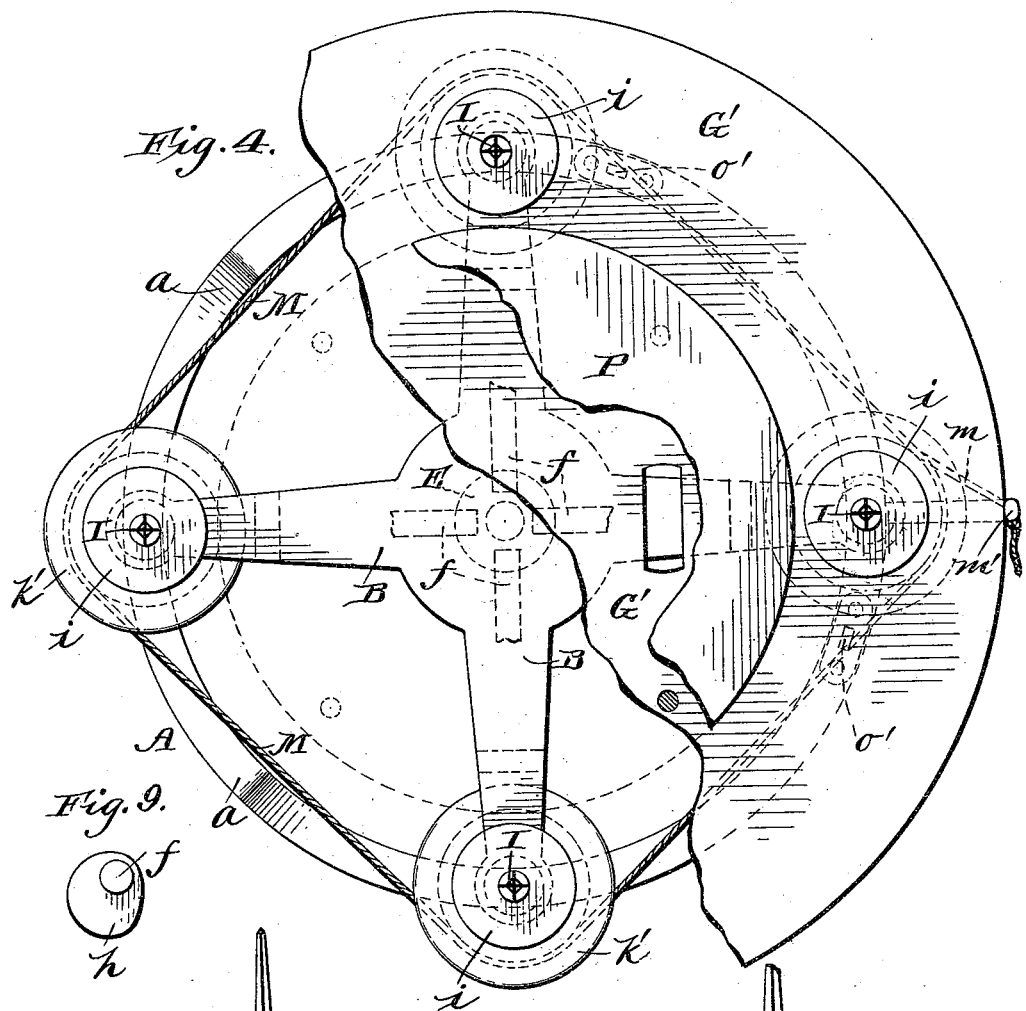
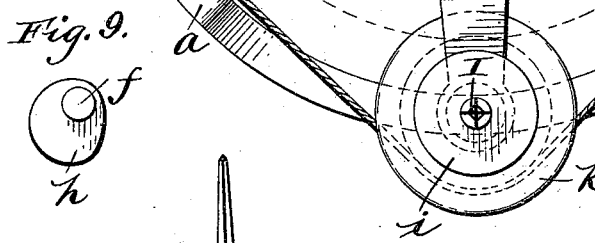
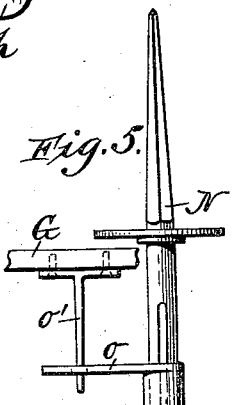
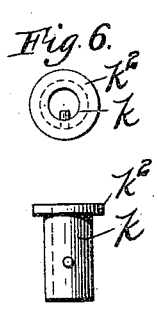
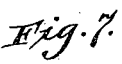
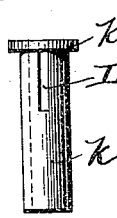
Witnesses
Severance
W. Harry Muzzy
Inventor
Fridrich W. G. Boettcher
by
Mason Fenwick & Lawrence
his Attorneys

UNITED STATES PATENT OFFICE.

FRIDRICH W. G. BOETTCHER, OF WEST DULUTH, MINNESOTA.

DISPLAY APPARATUS.

SPECIFICATION forming part of Letters Patent No. 546,912, dated September 24, 1895.

Application filed December 18, 1893. Renewed March 18, 1895. Serial No. 542,273. (No model.)

*To all whom it may concern:*

Be it known that I, FRIDRICH W. G. BOETTCHER, a citizen of the United States, residing at West Duluth, in the county of St. Louis and State of Minnesota, have invented certain new and useful Improvements in Display Apparatus; and I do hereby declare the following to be a full, clear, and exact description of the invention, such as will enable others skilled in the art to which it appertains to make and use the same.

My invention relates to improvements in revolving display-stands, especially for advertising purposes; and its object is to cause dolls or other figures mounted on a revolving platform to dance, giving said figures a revolving as well as a vertical movement, said motions representing, respectively, the waltz and schottische movements, also to cause these movements of the dolls or figures by means of the revolution of the display-platform.

I accomplish this object by the devices described and illustrated in the accompanying specification and drawings, in which—

Figure 1:
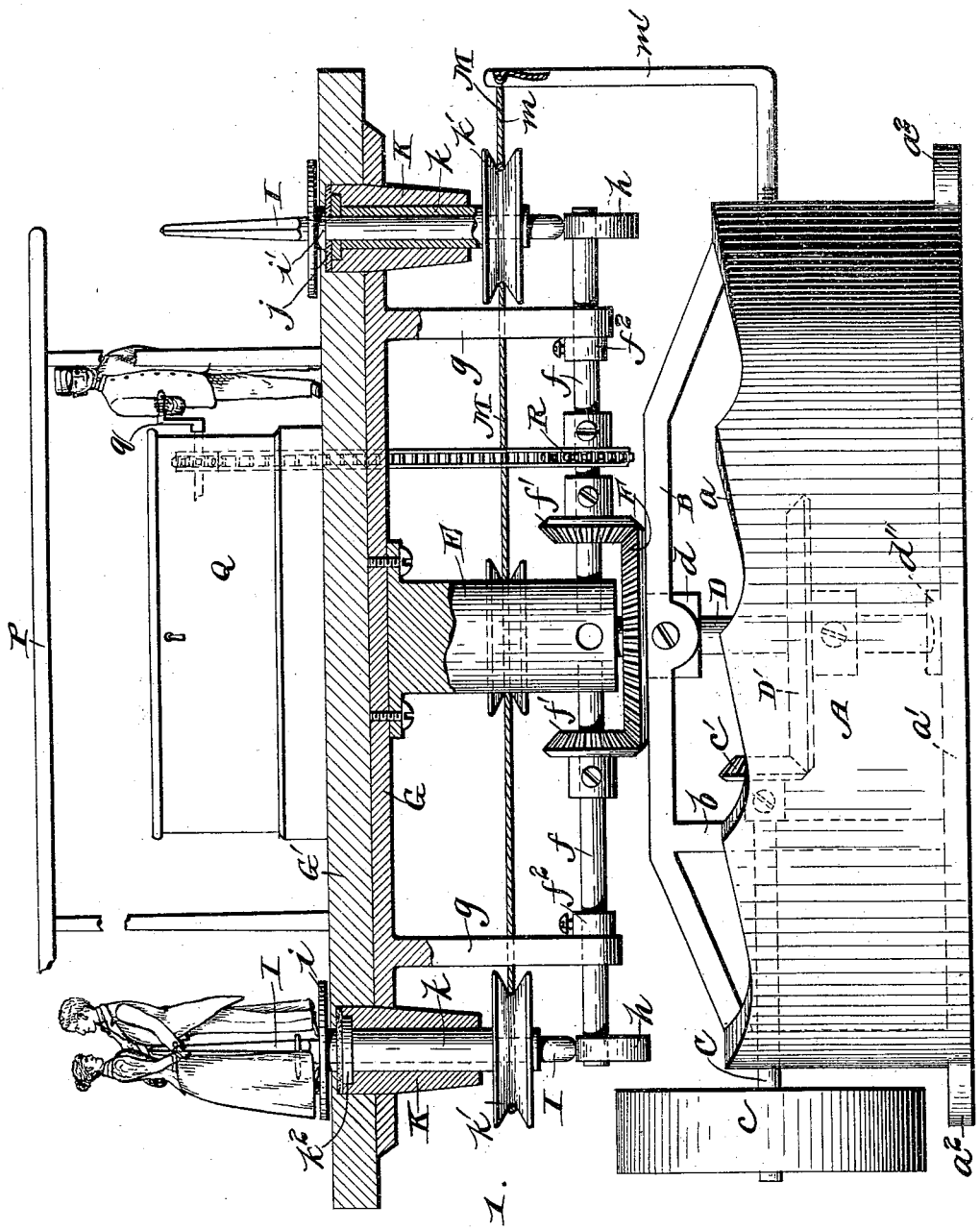
Figure 2:
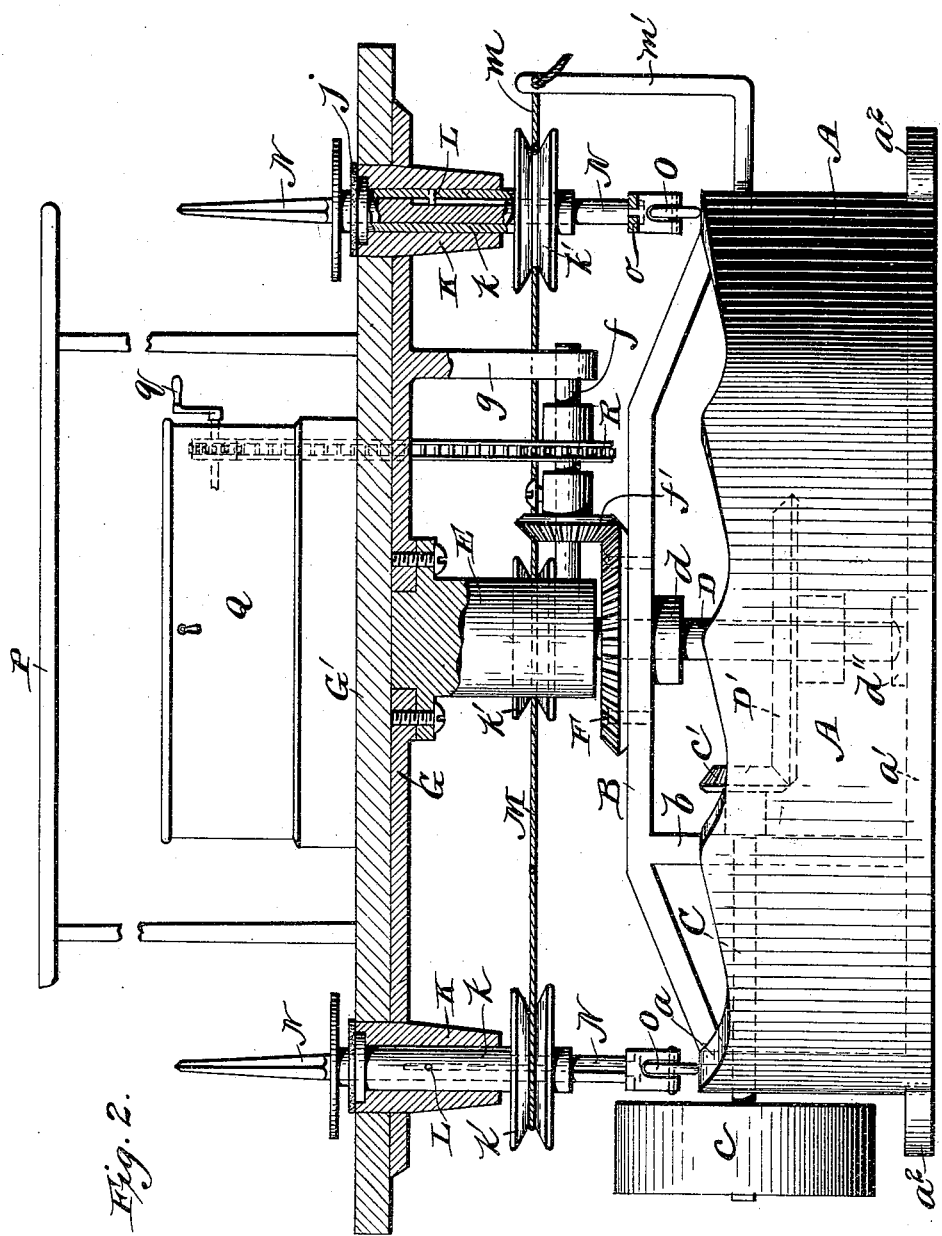

Figure 1 represents a central vertical section of the devices embodying my invention, the same being shown partly in side elevation. By this construction both waltz and schottische movements are secured. Fig. 2 represents a central vertical section, partly in side elevation, of a modification for producing the schottische movement only. Fig. 3 represents a central vertical section, partly in side elevation, of another modification for producing the waltz movement and provided with gearing for revolving the dolls. Fig. 4 represents a top plan view, partly broken away, of the construction shown in Fig. 1. Fig. 5 represents a side elevation of the doll-carrying spindle with an antifriction-wheel applied thereto. Fig. 6 represents a top plan view and side elevation of the spindle-carrying sleeve. Fig. 7 represents a modification of the same. Fig. 8 represents a side elevation of the doll-carrying spindle, slightly modified; and Fig. 9 represents a side elevation of the cam for causing the waltz movement.

A in the drawings represents an iron basering having a scalloped upper edge $a$ and provided across its bottom with a strip $a'$ and with apertured lugs $a^2$ for securing said basering to the floor of the show-window or other place where it is to be mounted. This base portion is also provided across the top with an arch or truss B, having an arm $b$, extending downward and joining the strip $a'$. A shaft C, from any suitable source of power, is journaled in the base and said arm $b$ and carries a belt-wheel $c$ and bevel-gear $c'$. A vertical shaft D is journaled in a block $d$, attached to the truss B, and has its lower end supported by a socketed block $d''$, mounted on the crossstrip $a'$. The shaft D carries a standard E, which supports the revolving display-platform frame G, said revolution being caused by a bevel-gear D' on said shaft D, meshing with the bevel-gear $c'$ of the power-shaft. The block $d$ is provided with horizontal bevelgear F, rigidly attached to it and to the truss B, the shaft D passing loosely through the same.

In the standard E are journaled the ends of four horizontal shafts $ff$, each being provided with an adjustable bevel-gear $f'$, that meshes with the stationary bevel-gear F. The outer portions of these shafts $f$ are each journaled in a hanger $g$ of the platform-frame G, and each of said shafts has a collar $f^2$ adjustably applied thereto on the inner side of its respective hanger $g$. The outer end of each of said shafts $f$ is provided with a cam $h$ for imparting a vertical movement to the doll-carrying spindles I, movably mounted directly above them in the platform-frame G and the platform proper G'. This cam is rounded or circular at the bottom and oval at the top, thus giving it as a whole the shape of an egg, which will cause the spindles to fall rapidly, but rise slowly, as shown in Fig. 9. Each spindle is provided near its upper end with a circular disk or platform $i$, upon which the dolls or figures rest and are fastened, the spindle extending above said platform and also assisting in supporting the dolls in their upright position. An annular extension $i'$ is formed on each spindle, and these extensions rest on rubber washers $j$, which are in turn supported by sleeves K, mounted in the platform. These sleeves K surround smaller sleeves $k$, which are provided with pulleywheels $k'$ and annular extensions $k^2$, the latter resting in annular recesses in said sleeves K, and thereby supporting said sleeves $k$ and pulleys $k'$ carried thereby. The spindles I revolve with the sleeves $k$, but are allowed vertical movement therein by means of a slot-and-groove connection L, as shown in Fig. 2. The lower ends of the spindles rest upon the cams $h$, so that when the shafts $f$ revolve a vertical movement is imparted to the dolls. A cord M is passed around the four pulleys (see Fig. 4) and the two ends secured together, so as to form an endless belt or cord, but leaving a small portion $m$ of one end of the cord free. This free portion is attached to an arm $m'$, rigidly secured to the base, and the said endless cord or belt is thus held stationary, and when the platform is revolved through its gearing the friction between the said cord and the moving pulley-wheels carried with the platform will cause said pulleys to revolve and thus revolve the spindles upon which they are mounted. At the same time the gears $f'$, moving with the platform, engage the gear F, and the shafts $f$ are thus revolved, causing the cams $h$ to do the same, and thus the spindles resting on the said cams are caused to rise and fall in the said sleeves by which they are carried, the rubber disks or buffers preventing any noise or shock when the spindles reach their lower positions. This movement caused by the cams, combined with the rotary movement imparted by the cord, causes the figures or dolls mounted on the circular platform $i$ to move with a motion very similar to a waltz.

If it is desired to have the figures schottische, the shafts $f$ are removed by loosening the collars $f^2$ and the gears $f'$ and sliding the said shafts out of their journals. A spindle N, as shown in Fig. 5, is then inserted in the place of each of the spindles I. This spindle has a castor or roller O, loosely mounted on its lower end, and said castor rests on the upper edge $a$ of the ring A, and an extension-arm $o$ of the castor-mounting engages and is guided by a pendent guiding-rod $o'$, mounted on the under side of the platform G, and the castor is thus always kept in a line with its curved annular track $a$. The curvatures of this portion of the base A causes the castors, and consequently the spindles and dolls carried thereby, to rise and fall with a sweeping or gliding motion very similar to the schottische movement. The said castors might be dispensed with, as the spindles could bear with their ends directly against the curved track. The slot-and-pin connection between the spindles and the sleeves surrounding the same for allowing the vertical movement of the spindles independent of the said sleeves may be, as shown in Fig. 6, with the pin in the sleeve and the slot in the spindle, or it may be, as shown in Figs. 7 and 8, with the pin in the spindle and the slot in the sleeve, one construction being regarded as the equivalent of the other. The platform G' is provided with a display-table P and a music-box Q, the handle $q$ of which may be grasped by an automaton, if desired. One of the shafts $f$ is provided with a sprocket-wheel R, connected by an invisible sprocket-chain with the operating-shaft of the said organ or music box, and thereby operates the same when the platform is rotated.

If it is desired to have the dolls waltz only, the modified construction as shown in Fig. 3 is employed. In this construction the base portion is not made curved or scalloped on its upper edge, and instead of the endless stationary cord and pulleys for rotating the spindles I employ a series of bevel-gears S $s\ s'\ s''$. The gears S are rigidly mounted on the sleeves $k$ and mesh with bevel-gears $s$, mounted on shaft T. These shafts T carry gears $s'$, that mesh with gears $s''$, mounted on the shafts $f$, and thus the motion imparted to said shafts $f$ by the rotation of the platform is communicated through the aforesaid gearing to the said spindles.

If the schottische movement alone is desired, I employ the construction illustrated in Fig. 2. In this all hangers and everything connected with the cams are omitted, the schottische movement being imparted by the anti-friction-rollers on the lower ends of the spindles rising and falling on the scalloped upper surface of the base-ring as the platform revolves, and thus causing said spindle to rise and fall with a sweeping gliding movement.

When the apparatus is in use, the whole mechanism below the platform G' is hid from view under the floor of the show-window.

The power for running the mechanism may be derived from any convenient and suitable source.

The dolls with their spindles may be removed, if desired, and the whole platform used for the display of goods; but as the dancing-dolls attract the attention and the eye of the customer to the goods placed on the table in the center of the platform they are very desirable and present a pleasing window decoration.

By the stationary-cord construction the dolls are caused to revolve in a direction opposite to that of the rotation of the platform itself, and thus presents their movement to the eye more decidedly.

What I claim as my invention is—

1. In a display apparatus, the combination of a revolving platform, means for revolving the same, a spindle carried by the platform and having a rotary movement about its own axis independent of the platform, said spindle also having a vertical movement, a doll carried by said spindle, and means for imparting the respective movements to the spindle and the doll, carried thereby, substantially as described.

2. In a display apparatus, the combination of a revolving platform, gearing for revolving the same, spindles loosely mounted in said platform, dolls mounted on said spindles, means for imparting vertical movement to said spindles, and a stationary cord arranged to engage a portion of said spindles and thereby rotate said spindles and dolls, substantially as described.

3. In a display apparatus, the combination of a revolving platform, gearing for revolving the same, doll-carrying spindles loosely mounted in said platform, shafts carrying cams and gears and mounted on the movable platform and imparting a vertical movement to the said spindles, a stationary gear meshing with the gears on the said shafts, and a stationary cord engaging a portion of said spindles for imparting a rotary movement to the same, substantially as described.

4. In a display apparatus, the combination of a revolving platform, means for revolving the same, doll-carrying spindles mounted in sleeves in said platform so as to have a vertical but no lateral movement independent of said sleeves, means for rotating said sleeves and means for imparting vertical movement to the said spindles and the dolls carried thereby, substantially as described.

In testimony whereof I hereunto affix my signature in presence of two witnesses.

FRIDRICH W. G. BOETTCHER.

Witnesses:
T. O. HALL,
W. A. SEELY.